United States Patent
Li et al.

(10) Patent No.: US 9,510,188 B2
(45) Date of Patent: Nov. 29, 2016

(54) METHODS PROVIDING WIRELESS DEVICE SUBSCRIPTION INFORMATION AND RELATED NETWORK NODES AND WIRELESS DEVICES

(71) Applicant: Telefonaktiebolaget L M Ericsson (publ), Stockholm (SE)

(72) Inventors: Qiang Li, Täby (SE); Justus Petersson, Hässelby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 15 days.

(21) Appl. No.: 14/607,620

(22) Filed: Jan. 28, 2015

(65) Prior Publication Data
US 2016/0174065 A1   Jun. 16, 2016

Related U.S. Application Data

(60) Provisional application No. 62/090,135, filed on Dec. 10, 2014.

(51) Int. Cl.
*H04M 3/00* (2006.01)
*H04W 8/20* (2009.01)
(Continued)

(52) U.S. Cl.
CPC .............. *H04W 8/205* (2013.01); *H04L 67/06* (2013.01); *H04W 4/001* (2013.01)

(58) Field of Classification Search
CPC ... H04W 8/205; H04W 4/001; H04W 4/005; H04L 67/06
USPC ....... 455/419, 433, 412.1, 466, 435.1, 432.1
See application file for complete search history.

(56) References Cited

U.S. PATENT DOCUMENTS 8,145,197 B2 * 3/2012 Boberg ............. H04M 3/42365
455/414.1
8,549,155 B2 * 10/2013 Skog ................... H04L 12/2818
709/228
(Continued)

FOREIGN PATENT DOCUMENTS

EP       2 114 063 A1    11/2009
JP      2015-026254 A     2/2015
(Continued)

OTHER PUBLICATIONS

GSMA: "Embedded SIM Remote Provisioning Architecture", GSM Association, Official Doc. 12FAST.13, Version 1.1, Dec. 17, 2013; 84 pages.
(Continued)

*Primary Examiner* — Marceau Milord
(74) *Attorney, Agent, or Firm* — Myers Bigel, P.A.

(57) ABSTRACT

Methods may be provided to operate a wireless device including memory with dummy subscription information stored therein. Such methods may include transmitting an attach request message over a radio interface to a mobile communication network, wherein the attach request message includes the dummy subscription information. After transmitting the attach request message, active subscription information for the mobile communication network may be received over the radio interface, wherein the active subscription information is different than the dummy subscription information. In addition, the active subscription information for the mobile communication network may be stored in memory.

17 Claims, 7 Drawing Sheets

(51) Int. Cl.
*H04W 4/00* (2009.01)
*H04L 29/08* (2006.01)

(56) References Cited

U.S. PATENT DOCUMENTS

| | | | |
|---|---|---|---|
| 9,015,346 B2* | 4/2015 | Krishnan | H04L 61/2514 709/223 |
| 2009/0131022 A1* | 5/2009 | Buckley | H04L 12/5895 455/412.1 |
| 2013/0331096 A1* | 12/2013 | Rogan | H04W 8/12 455/433 |
| 2014/0370886 A1* | 12/2014 | Lisak | H04W 36/0022 455/426.1 |
| 2015/0105080 A1* | 4/2015 | Jin | H04W 36/0038 455/436 |

FOREIGN PATENT DOCUMENTS

| WO | WO 2009/026170 A2 | 2/2009 |
|---|---|---|
| WO | WO 2013/131647 A2 | 9/2013 |

OTHER PUBLICATIONS

GSMA: "Remote Provisioning Architecture for Embedded UICC", GSM Association, Official Doc. SGP.02, Technical Specification Version 2.0, Oct. 13, 2014; 293 pages.

International Search Report and Written Opinion Corresponding to International Application No. PCT/SE2015/050118; Date of Mailing: Nov. 18, 2015; 17 Pages.

* cited by examiner

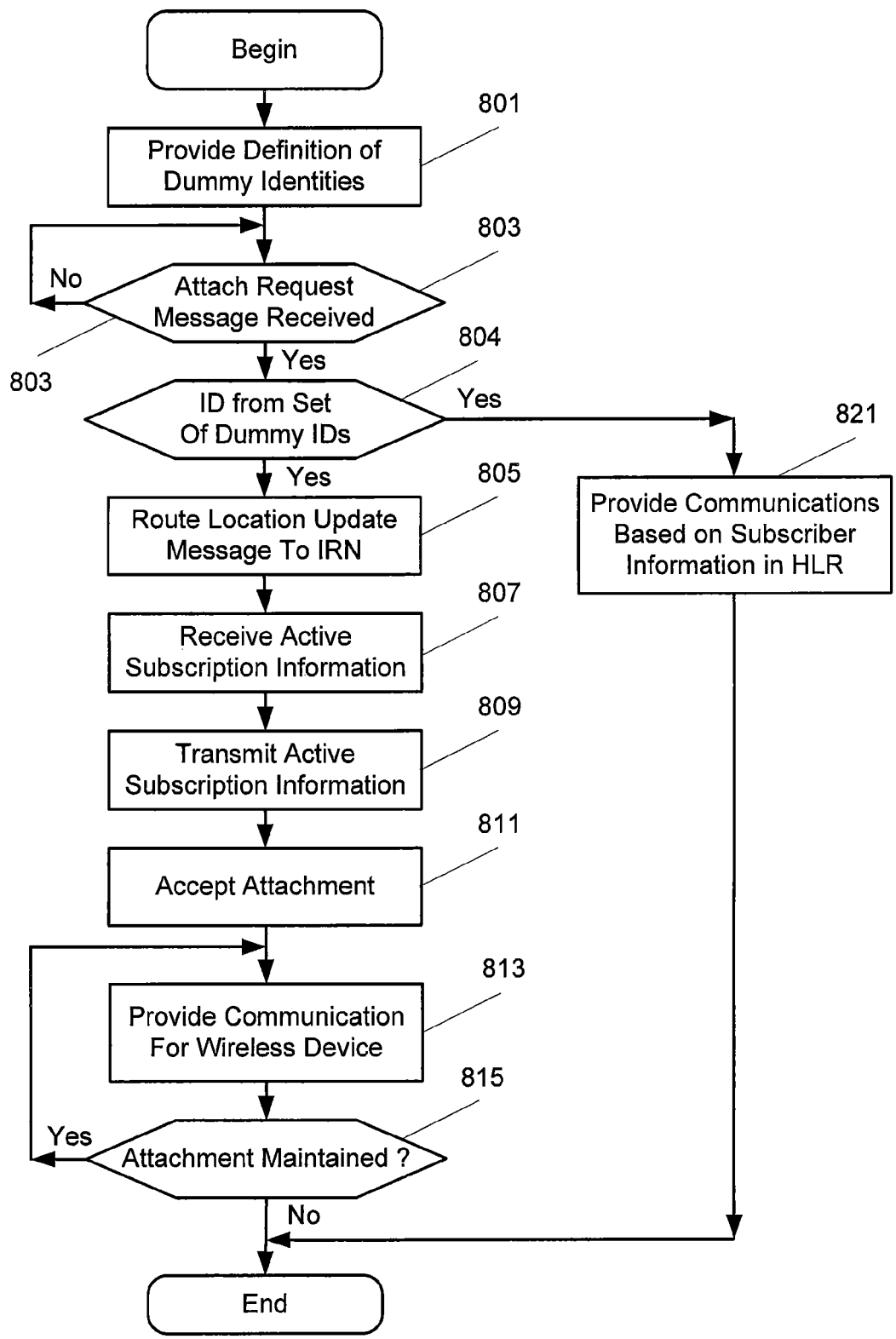

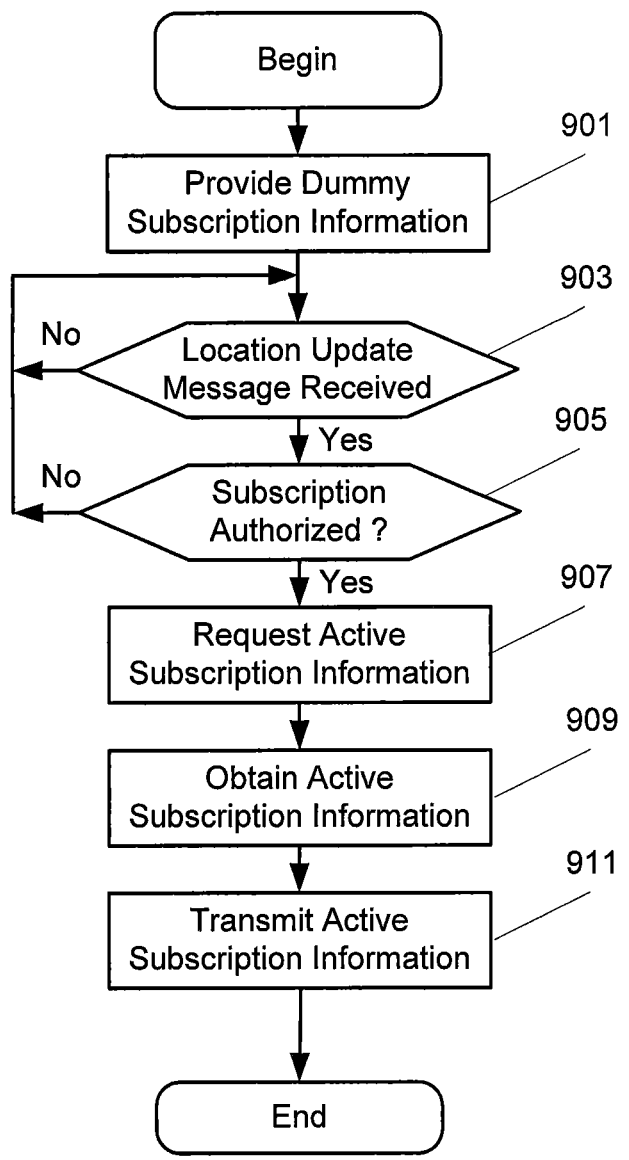

METHODS PROVIDING WIRELESS DEVICE SUBSCRIPTION INFORMATION AND RELATED NETWORK NODES AND WIRELESS DEVICES

CROSS REFERENCE TO RELATED APPLICATIONS

This application claims the benefit of U.S. provisional Patent Application No. 62/090,135, filed Dec. 10, 2014, the disclosure and content of which is incorporated by reference herein in its entirety.

The present disclosure relates to wireless communications, and more particularly, to methods providing information for wireless devices and related network nodes and wireless devices.

Historically every cellular device has been equipped with a removable SIM (Subscriber Identity Module) card. Recently GSMA has published the specifications for "non-removable SIM", referred to as the embedded SIM, eSIM, or eUICC (Embedded Universal Integrated Circuit Card). The uptake in number of connections based on this GSMA specification is projected to reach about 1 billion in 2020 in accordance with Beecham research.

Examples of usage areas for which eSIM may play a significant/critical role may range from traditional M2M (machine-to-machine) services such as Utility and Automotive to pure Connected Consumer Electronics.

A potentially important use-case for all of the above areas may be when the device (including an eUICC Card) is provisioned with its first commercial operator. This process is commonly referred to as "Bootstrapping" or "Provisioning of first operational profile." In order for this process to work, the eUICC (embedded Universal Integrated Circuit Card) may need to be pre-provisioned with a Bootstrap mean, in short an IMSI (International Mobile Subscriber Identity) number (also referred to as an identification or identification number), to establish a cellular connection used/needed to download and/or enable a first operational profile, e.g., for a first commercial operator.

The role of facilitating the Bootstrap mean and the Bootstrapping process may be important/critical for Ericsson's DCP (Device Connection Platform) as a Service in its pursuit for new businesses where the relationship not only with the traditional operators but also with their customers, namely the device makers (e.g., Original Equipment Manufacturers or OEMs), may be increasingly important.

Use of eUICC is discussed in GSMA Embedded SIM Solution Specification. See, Reference [1], (GSMA Embedded SIM Remote Provisioning Architecture, Version 1.1, 17 Dec. 2013), the disclosure of which is hereby incorporated herein in its entirety by reference. Each eUICC may include mandatory provisioning subscription information and may also include one or more optional operational subscription(s).

Provisioning subscriptions have been a significant obstacle for eUICC commercialization, because provisioning subscriptions may require extra numbering resources (e.g., IMSI/MSISDN identification numbers are becoming more limited resources) and extra cost in a mobile network operator's HLR (Home Location Register) space (e.g., licensing cost), and provisioning subscriptions may always need to be active on the HLR to make sure each eUICC can fall back to this provisioning subscription in case of connectivity failure during its entire lifecycle due to many failure reasons. The always-active provisioning subscription in the operator network may continuously generate extra cost that operators and enterprises may be required to pay for. In summary, the extra provisioning subscription in eUICC may increase complexity and/or cost.

SUMMARY

According to some embodiments of inventive concepts, a method may be provided to operate a wireless device including memory with dummy subscription information stored therein. The method may include transmitting an attach request message over a radio interface to a mobile communication network, with the attach request message including the dummy subscription information. After transmitting the attach request message, active subscription information may be received for the mobile communication network over the radio interface, with the active subscription information being different than the dummy subscription information. The active subscription information for the mobile communication network may be stored in memory.

By using dummy subscription information, a dummy connection may be established to support provisioning connectivity used to provide an active subscription. Moreover, the dummy subscription information may be stored in memory when the wireless device is manufactured or during initial personalization, and the wireless device can be provisioned later with a new local operator subscription using dummy connectivity.

After receiving the active subscription information, the wireless device may attach to the mobile communication network over the radio interface using the active subscription information. Attaching to the mobile communication network using the active subscription information may include enabling the active subscription information for the mobile communication network and disabling the dummy subscription information while maintaining the dummy subscription information in memory.

Receiving the active subscription information may include receiving the active subscription information over the radio interface using a circuit switched connection. Receiving the active subscription information may include receiving the active subscription information over the radio interface using SS7 and/or SMS signaling. Receiving the active subscription information may include receiving the active subscription information over the radio interface using a packet switched connection.

Before receiving the active subscription information, an attach accept message may be received from the mobile communication network over the radio interface, with the attach accept message being responsive to the attach request message. After receiving the attach accept message, a Packet Data Protocol (PDP) connection may be established using the dummy subscription information, and receiving the active subscription information may include receiving the active subscription information over the radio interface using the PDP connection.

The dummy subscription information may include a dummy identification for the wireless device, the active subscription information may include an active identification for the wireless device, and the dummy identification and the active identification may be different. The dummy identification may include a dummy International Mobile Subscriber Identity (IMSI), the active identification may include an active IMSI, and the dummy IMSI and the active IMSI may be different.

The dummy subscription information may include a dummy access point name (APN) and/or dummy network credentials.

The active subscription information may include an Integrated Circuit Card Identifier (ICCID), network credentials for the mobile communication network, a Personal Identification Number (PIN), a Personal Unblocking Code (PUK), and/or an Access Point Name (APN) for the mobile communication network.

The attach request message may include a domain attach request message for a circuit switched connection.

The attach request message may include a domain attach request message for a packet switched connection.

The mobile communication network may be a first mobile communication network, and the active subscription information for the mobile communication network may be first active subscription information for the first mobile communication network. After storing the first active subscription information for the mobile communication network, a second attach request message may be transmitted over a radio interface to a second mobile communication network, and the second attach request message may include the dummy subscription information. After transmitting the second attach request message, second active subscription information may be received for the second mobile communication network over the radio interface, and the second active subscription information may be different than the dummy subscription information. The second active subscription information may be stored for the second mobile communication network in memory.

Transmitting the second attach request message may include transmitting the second attach request message responsive to failure communicating with the first mobile communication network.

According to some other embodiments of inventive concepts, a wireless device may include a transceiver, memory, and a processor coupled with the transceiver and memory. The transceiver may be configured to transmit uplink radio communications over a radio interface to a mobile network and to receive downlink radio communications over the radio interface from the mobile network. The memory may have dummy subscription information stored therein, and the dummy subscription information may include a dummy identification (IMSI) for the wireless device. In addition, the processor may be configured to transmit an attach request message through the transceiver to a mobile communication network, with the attach request message including the dummy subscription information. The processor may also be configured to receive active subscription information for the mobile communication network after transmitting the attach request message, with the active subscription information being different than the dummy subscription information, and with the active subscription information being received through the transceiver. In addition, the processor may be configured to store the active subscription information in memory.

According to still other embodiments of inventive concepts, a method of operating a mobile communication network may include receiving an attach request message from a wireless device, with the attach request message including dummy subscription information with a dummy identification for the wireless device. A location update message may be routed to an initial registration node (IRN) with the location update message including the dummy subscription information for the wireless device. After routing the location update message to the initial registration node, active subscription information may be received from the initial registration node (IRN), and the active subscription information may be transmitted to the wireless device.

By routing the location update message to the initial registration node, dummy subscription information may not need to be maintained at the mobile communication network.

After transmitting the active subscription information, attachment of the wireless device may be accepted using the active subscription information.

The dummy subscription information may include a dummy International Mobile Subscriber Identity (IMSI) and a dummy Access Point Name (APN), receiving the active subscription information may include establishing a Packet Data Protocol (PDP) connection between the wireless device and the initial registration node (IRN) based on the dummy IMSI and the dummy APN, receiving the active subscription information may include receiving the active subscription information over the PDP connection, and transmitting the active subscription information may include transmitting the active subscription information over the PDP connection. Moreover, establishing the PDP connection may include transmitting an attach accept message to the wireless device, and the attach accept message may be responsive to the attach request message.

Receiving the active subscription information may include receiving the active subscription information over a packet switched connection, and transmitting the active subscription information may include transmitting the active subscription information over the packet switched connection.

Receiving the active subscription information may include establishing a circuit switched (CS) connection between the wireless device and the initial registration node (IRN) and receiving the active subscription information from the initial registration node over the circuit switched connection, and transmitting the active subscription information may include transmitting the active subscription information over the circuit switched connection to the wireless device. Moreover, receiving the active subscription information may include receiving the active subscription information using SS7 and/or SMS signaling, and transmitting the active subscription information may include transmitting the active subscription information using SS7 and/or SMS signaling.

Routing the location update message to the initial registration node may include routing the location update message responsive to determining that the dummy identification is a dummy identification number in a set of defined dummy identification numbers.

The initial registration node may be outside the mobile communication network.

The dummy subscription information may include a dummy identification for the wireless device, the active subscription information may include an active identification for the wireless device, and the dummy identification and the active identification may be different. Moreover, the dummy identification may be a dummy International Mobile Subscriber Identity (IMSI), the active identification may be an active IMSI, and the dummy IMSI and the active IMSI may be different.

The dummy subscription information may include a dummy access point name (APN) and/or dummy network credentials.

The active subscription information may include an Integrated Circuit Card Identifier (ICCID), network credentials for the mobile communication network, a Personal Identification Number (PIN), a Personal Unblocking Code (PUK), and/or an Access Point Name (APN) for the mobile communication network.

The attach request message may include a domain attach request message for a circuit switched connection.

The attach request message may include a domain attach request message for a packet switched connection.

The active subscription information may be stored in a Home Location Register (HLR) of the mobile communication network.

According to yet other embodiments of inventive concepts, a node of a mobile communication network may include a network interface, and a processor coupled with the network interface. The network interface may be configured to provide communication with a wireless device through a radio access network and to provide communication with an initial registration node (IRN) outside the communication network. The processor may be configured to receive an attach request message through the network interface and the radio access network from a wireless device, and the attach request message may include dummy subscription information with a dummy identification for the wireless device. The processor may also be configured to route a location update message through the network interface to an initial registration node (IRN), to receive active subscription information through the network interface from the initial registration node (IRN) after routing the location update message to the initial registration node, and to transmit the active subscription information through the network interface and the radio access network to the wireless device.

The node may include a mobile switching center, and the processor may be configured to receive and transmit the active subscription information over a circuit switched connection between the wireless device and the initial registration node (IRN).

The node may include a Service GPRS Support Node, and the processor may be configured to receive and transmit the active subscription information over a packet switched connection between the wireless device and the initial registration node (IRN).

According to other embodiments of inventive concepts, a method of operating an initial registration node (IRN) may include receiving a location update message for a wireless device from a mobile communication network, and the location update message may include dummy subscription information with a dummy identification for the wireless device. Responsive to receiving the location update message, active subscription information for the wireless device may be obtained, and the active subscription information may be transmitted through the mobile communication network to the wireless device.

The dummy subscription information may include a dummy International Mobile Subscriber Identity (IMSI) and a dummy Access Point Name (APN). Transmitting the active subscription information may include establishing a Packet Data Protocol (PDP) connection through the mobile communication network between the wireless device and the initial registration node (IRN) based on the dummy IMSI and the dummy APN, and transmitting the active subscription information over the PDP connection.

Transmitting the active subscription information may include transmitting the active subscription information through the mobile communication network to the wireless device over a packet switched connection.

Before transmitting the active subscription information, a circuit switched (CS) connection may be established through the mobile communication network between the wireless device and the initial registration node (IRN). In addition, transmitting the active subscription information may include transmitting the active subscription information over the circuit switched connection through the mobile communication network to the wireless device. Moreover, transmitting the active subscription information may include transmitting the active subscription information through the mobile communication network to the wireless device using SS7 and/or SMS signaling.

The initial registration node may be outside the mobile communication network.

The dummy subscription information may include a dummy identification for the wireless device, the active subscription information may include an active identification for the wireless device, and the dummy identification and the active identification may be different. Moreover, the dummy identification may be a dummy International Mobile Subscriber Identity (IMSI), the active identification may be an active IMSI, and the dummy IMSI and the active IMSI may be different.

The dummy subscription information may include a dummy access point name (APN) and/or dummy network credentials.

The active subscription information may include an Integrated Circuit Card Identifier (ICCID), network credentials for the mobile communication network, a Personal Identification Number (PIN), a Personal Unblocking Code (PUK), and/or an Access Point Name (APN) for the mobile communication network.

The active subscription information may be transmitted to a Home Location Register (HLR) of the mobile communication network.

Responsive to receiving the location update message, a request for provisioning information may be generated for the wireless device, and obtaining the active subscription information may include receiving active subscription information for the wireless device after generating the request for provisioning information for the wireless device. Moreover, generating a request may include generating a request for provisioning information for the wireless device responsive to receiving the location update message and responsive to determining that there is a need to download a new active subscription to the wireless device.

Obtaining active subscription information may include obtaining active subscription information for the wireless device responsive to receiving the location update message and responsive to determining that there is a need to download a new active subscription to the wireless device.

According to other embodiments of inventive concepts, an initial registration node (IRN) may include a network interface configured to provide communication with a mobile communication network and a processor coupled with the network interface The processor may be configured to receive a location update message for a wireless device from a mobile communication network, and the location update message may include dummy subscription information with a dummy identification for the wireless device. The processor may also be configured to obtain active subscription information for the wireless device responsive to receiving the location update message, and to transmit the active subscription information through the mobile communication network to the wireless device.

According to other embodiments of inventive concepts, a wireless device may include an interface unit, a memory unit, and a processor unit coupled with the transceiver unit and the memory unit. The interface unit may be adapted to transmit uplink radio communications over a radio interface to a mobile network and to receive downlink radio communications over the radio interface from the mobile network.

The memory unit may have dummy subscription information stored therein, and the dummy subscription information may include a dummy identification (IMSI) for the wireless device. The processor unit may be adapted to transmit an attach request message through the interface unit to a mobile communication network, and the attach request message may include the dummy subscription information. The processor unit may be adapted to receive active subscription information for the mobile communication network after transmitting the attach request message, the active subscription information may be different than the dummy subscription information, and the active subscription information may be received through the interface unit. The processor unit may also be adapted to store the active subscription information in memory.

According to other embodiments of inventive concepts, a node of a mobile communication network may include an interface unit and a processor unit coupled with the interface unit. The interface unit may be adapted to provide communication with a wireless device through a radio access network and adapted to provide communication with an initial registration node (IRN) outside the communication network. The processor unit may be adapted to receive an attach request message through the interface unit and the radio access network from a wireless device, and the attach request message may include dummy subscription information with a dummy identification for the wireless device. The processor unit may be adapted to route a location update message through the interface unit to an initial registration node (IRN), to receive active subscription information through the interface unit from the initial registration node (IRN) after routing the location update message to the initial registration node, and to transmit the active subscription information through the interface unit and the radio access network to the wireless device.

The node may include a mobile switching center, and the processor unit may be adapted to receive and transmit the active subscription information over a circuit switched connection between the wireless device and the initial registration node (IRN).

The node may include a Service GPRS Support Node, and the processor unit may be adapted to receive and transmit the active subscription information over a packet switched connection between the wireless device and the initial registration node (IRN).

According to other embodiments of inventive concepts, an initial registration node (IRN) may include an interface unit adapted to provide communication with a mobile communication network, and a processor unit coupled with the interface unit. The processor unit may be adapted to receive a location update message for a wireless device through the interface unit from a mobile communication network, and the location update message may include dummy subscription information with a dummy identification for the wireless device. The processor unit may be adapted to obtain active subscription information for the wireless device responsive to receiving the location update message, and to transmit the active subscription information through the interface unit and the mobile communication network to the wireless device.

BRIEF DESCRIPTION OF THE DRAWINGS

The accompanying drawings, which are included to provide a further understanding of the disclosure and are incorporated herein and constitute a part of this application, illustrate certain non-limiting embodiments of inventive concepts. In the drawings:

FIGS. 7, 8, and 9 are flow charts illustrating operations of elements of FIGS. 1-6.

DETAILED DESCRIPTION

Inventive concepts will now be described more fully hereinafter with reference to the accompanying drawings, in which examples of embodiments of inventive concepts are shown. Inventive concepts may, however, be embodied in many different forms and should not be construed as limited to the embodiments set forth herein. Rather, these embodiments are provided so that this disclosure will be thorough and complete, and will fully convey the scope of inventive concepts to those skilled in the art. It should also be noted that these embodiments are not mutually exclusive. Components from one embodiment may be tacitly assumed to be present/used in another embodiment.

For purposes of illustration and explanation only, these and other embodiments of inventive concepts are described herein in the context of operating in/with a RAN (Radio Access Network) and/or a core network of a public land mobile network PLMN that communicates over radio communication channels with wireless devices. It will be understood, however, that inventive concepts are not limited to such embodiments and may be embodied generally in any type of communication network. As used herein, a wireless device (also referred to as a UE, user equipment node, mobile device, mobile terminal, wireless terminal, etc.) can include any device that receives data over a wireless interface (also referred to as a radio interface) from and/or transmits data over a wireless interface to a wireless/radio communication network, and may include, but is not limited to, a mobile telephone ("cellular" telephone), laptop/portable computer, pocket computer, hand-held computer, an M2M (machine-to-machine) device, IoT (Internet of Things) device, and/or desktop computer.

Note that although terminology from 3GPP (3rd Generation Partnership Project) LTE (Long Term Evolution) has been used in this disclosure to provide examples of embodiments of inventive concepts, this should not be seen as limiting the scope of inventive concepts to only the aforementioned system. Other wireless systems, including WCDMA, WiMax, UMB, and/or GSM, may also benefit from exploiting ideas/concepts covered within this disclosure.

Also, note that terminology such as base station (also referred to as an eNodeB, eNB, etc.) and wireless device (also referred to as a UE, user equipment node, mobile device, mobile terminal, wireless terminal, etc.) should be considering non-limiting.

Figure 1:
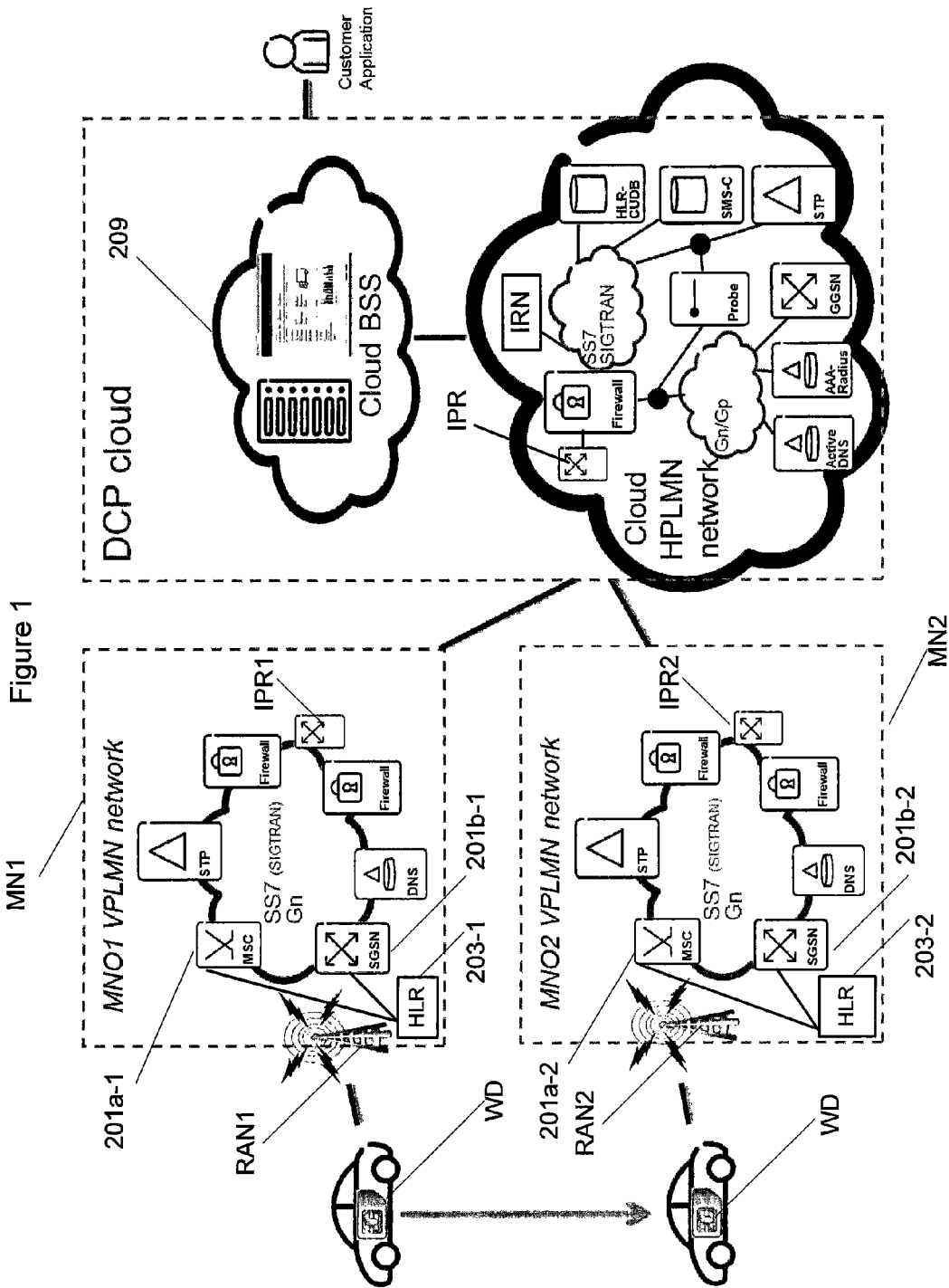
FIG. 1 is a schematic diagram illustrating wireless devices and network elements according to some embodiments of inventive concepts.

FIG. 1 is a schematic diagram illustrating an EDCP/DCP Network (DCP Cloud). Some embodiments of inventive concepts may be implemented with/in the EDCP/DCP network (e.g., Ericsson Device Connection Platform for M2M Machine-to-Machine connections) or a similar hosted core network/HPLMN (Home Public Land Mobile Network) as a service for multiple VPLMN (Visited Public Land Mobile Network) operators MNO1 and MNO2 as shown, for example, in FIG. 1.

Each VPLMN MN1 and MN2 may include a Radio Access Network RAN (e.g., RAN1 and RAN2) and a core network, with the core network including nodes, such as a mobile switching center MSC (201a-1 and 201a-2), a Signaling Gateway Supporting Node SGSN (201b-1 and 201b-2), a Domain Name System DNS, one or more Firewalls, a Signaling Transfer Point STP, and/or an Internet Protocol IP (Internet Protocol) router (IPR1 and IPR2), coupled over an SS7 (Signaling System No. 7) Sigtran (Signaling Transport) network (e.g., using a Gn interface/interfaces). Each VPLMN network may thus support uplink and downlink communications with mobile devices such as wireless device WD.

In EDCP, a multi-tenant HLR (Home Location Register) and other core network nodes (e.g., Gateway GPRS Support Node GGSN, Short Message Service Center SMSC, etc.) may be hosted in a cloud HPLMN (home public land mobile network) as a core network service for all our on-boarded mobile network operators (e.g., MNO1 and MNO2). All M2M (machine-to-machine) subscribers of the DCP network may be registered and/or stored on DCP HLR. The DCP may provide connectivity as a service to all operators (e.g., operators MNO1 and MNO2) rather than selling the standard core network nodes (e.g., HLR, GGSN, SMSC, etc.) for each VPLMN network.

On top of DCP core network services supported by the cloud HPLMN network of FIG. 1, a cloud Business Support System BSS may be hosted to provision and/or manage, for example, subscriber data, processes, billing, etc. In addition, eUICC features may be added to the DCP platform to address market demands/needs (e.g., eUICC for M2M connections from Automotive, Smart metering, Security cameras, Consumer Electronics, etc.).

As shown in FIG. 1, the cloud HPLMN network may include an IP router (IPR), a firewall, an active Domain Name Server DNS, an AAA (Authentication, Authorization, and Accounting) Radius Server AAA-Radius, a GPRS Support Node GGSN, a monitoring probe (labeled Probe), a Signaling Transfer Point STP, a Short Message Service Center SMSC, and a Home Location Register HLR coupled with a Central Unified DataBase CUDB. Moreover, elements of the cloud HPLMN network may be coupled using an SS7 Sigtran network and/or using Gn/Gp interfaces. Elements of FIG. 1 are discussed in greater detail below with respect to FIGS. 2, 3, 4, and 5.

Figure 2:
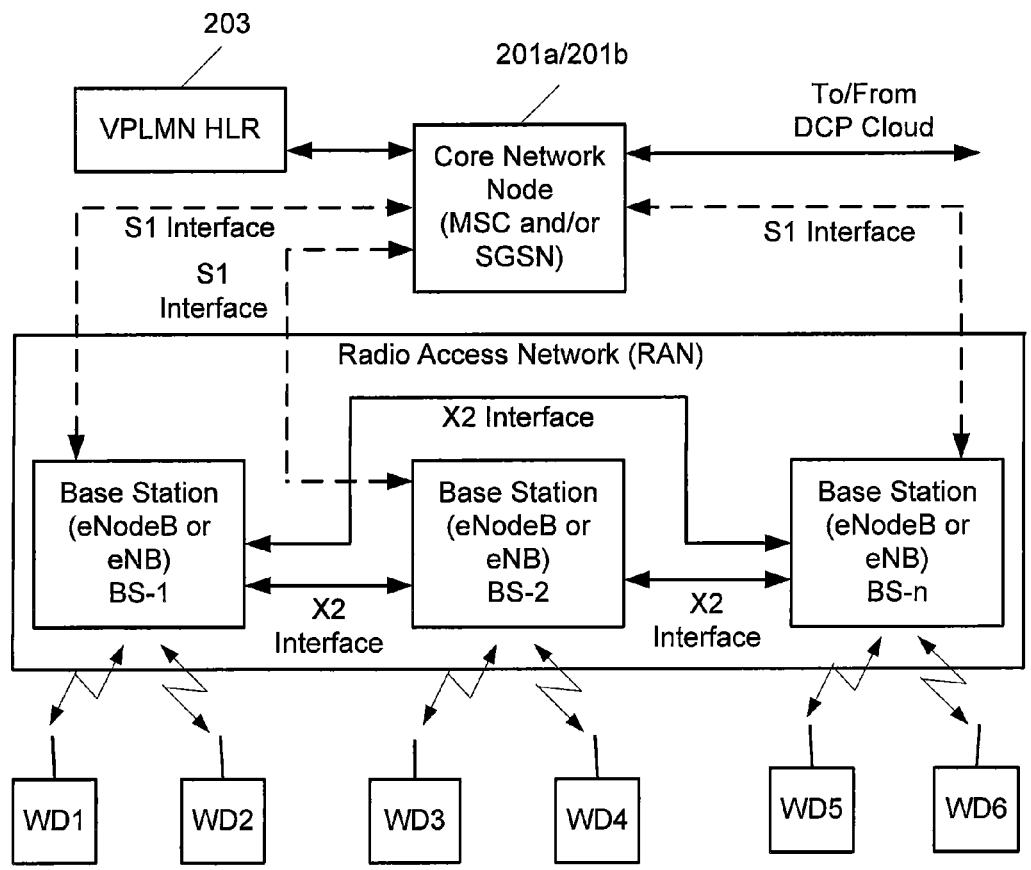
FIG. 2 is a block diagram illustrating elements of a mobile communication network according to FIG. 1.

FIG. 2 is a block diagram further illustrating elements of a VPLMN network of FIG. 1 according to some embodiments of present inventive concepts. As shown, a radio access network RAN (e.g., RAN1 or RAN2 of FIG. 1) may provide communications between base stations BS-1, BS-2, and BS-3 and one or more core network nodes 201a/201b (e.g., Mobile Switching Center and/or Service GPRS Support Node SGSN) using respective S1 interfaces, and communications between base stations may be provided using respective X2 interfaces. Each base station BS may communicate over a radio interface (including uplinks and downlinks) with respective mobile devices WDs in a respective cell or cells supported by the base station. By way of example, base station BS-1 is shown in communication with wireless devices WD1 and WD2, base station BS-2 is shown in communication with wireless devices WD3 and WD4, and base station BS-3 is shown in communication with wireless devices WD5 and WD6.

Each base station BS may include a transceiver circuit (also referred to as a transceiver or radio interface) configured to provide radio communications with a plurality of wireless devices, a network interface circuit (also referred to as a network interface) configured to provide communications with other base stations of the RAN (e.g., over the X2 interface), a processor circuit (also referred to as a processor) coupled to the transceiver circuit and the network interface circuit, and a memory circuit coupled to the processor circuit. The memory circuit may include computer readable program code that when executed by the processor circuit causes the processor circuit to perform operations according to embodiments disclosed herein. According to other embodiments, processor circuit may be defined to include memory so that a memory circuit is not separately provided.

For ease of illustration, FIG. 2 illustrates one core network node that, for example, may be a VPLMN MSC 201a of FIG. 1 or a VPLMN SGSN 201b of FIG. 1. As discussed in greater detail below, some embodiments of inventive concepts may provide connectivity between an eSIM/eUICC device and the cloud HPLMN network using a circuit switched CS connection through MSC 201a, while some other embodiments of inventive concepts may provide connectivity between an eSIM/eUICC device and the cloud HPLMN network using a packet switched PS connection through SGSN 201b. Moreover, core network node 201a/201b may be coupled to a VPLMN HLR 203 as shown in FIGS. 1 and 2.

Figure 3:
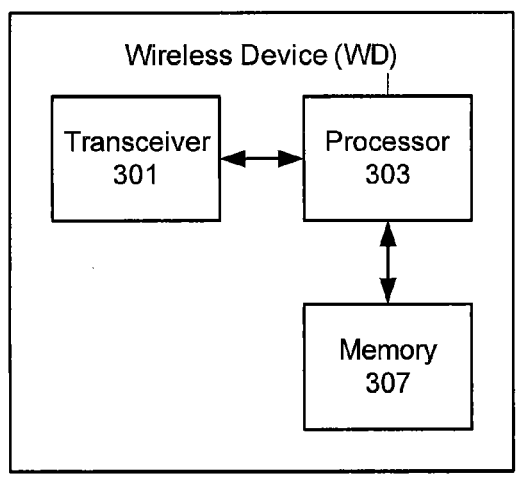
FIG. 3 is a block diagram illustrating elements of a wireless device according to FIG. 1.

FIG. 3 is a block diagram illustrating elements of a wireless device WD of FIG. 1. As shown, a wireless device WD may include a transceiver circuit 301 (also referred to as a transceiver) including a transmitter and a receiver configured to provide radio communications with a base station BS, a processor circuit 303 (also referred to as a processor) coupled to the transceiver circuit, and a memory circuit 307 coupled to the processor circuit. The memory circuit 307 may include computer readable program code that when executed by the processor circuit 303 causes the processor circuit to perform operations according to embodiments disclosed herein. According to other embodiments, processor circuit 303 may be defined to include memory so that a memory circuit is not separately provided.

Figure 4:
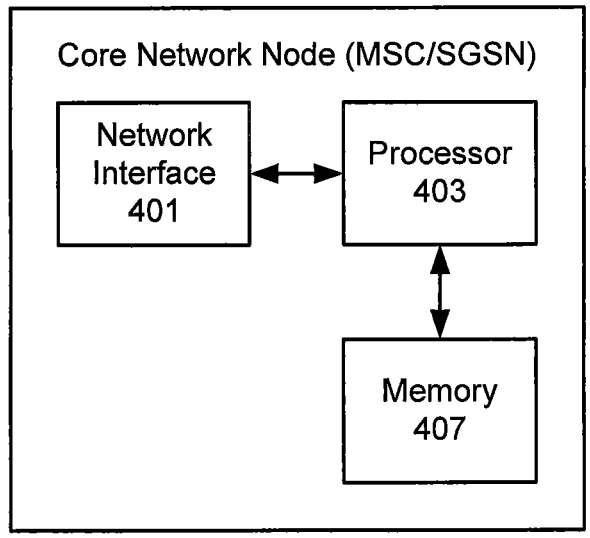
FIG. 4 is a block diagram illustrating elements of a core network node according to FIG. 1.

FIG. 4 is a block diagram illustrating elements of a core network node (e.g., an MSC 201a and/or an SGSN 201b) of FIGS. 1 and 2. As shown, a core network node 201a/1201b may include a network interface circuit 401 (also referred to as a network interface), a processor circuit 403 (also referred to as a processor) coupled to the network interface circuit, and a memory circuit 407 coupled to the processor circuit. The memory circuit 407 may include computer readable program code that when executed by the processor circuit 403 causes the processor circuit to perform operations according to embodiments disclosed herein. According to other embodiments, processor circuit 403 may be defined to include memory so that a memory circuit is not separately provided. Network interface circuit 401 may be configured to provide communications with base stations of the RAN (e.g., over the S1 interface) and/or to provide communications with the DPC cloud.

Figure 5:
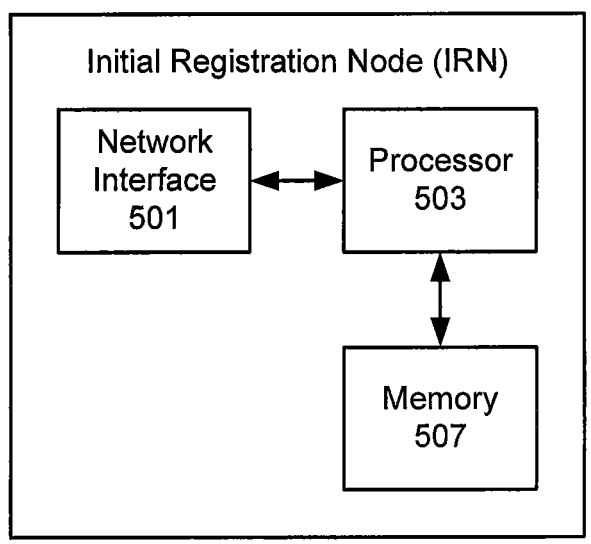
FIG. 5 is a block diagram illustrating elements of an initial registration node according to FIG. 1.

FIG. 5 is a block diagram illustrating elements of an initial registration node IRN that may be included in the cloud HPLMN network of FIG. 1. As shown, initial registration node IRN may include a network interface circuit 501 (also referred to as a network interface), a processor circuit 503 (also referred to as a processor) coupled to the network interface circuit, and a memory circuit 507 coupled to the processor circuit. The memory circuit 507 may include computer readable program code that when executed by the processor circuit 503 causes the processor circuit to perform operations according to embodiments disclosed herein. According to other embodiments, processor circuit 503 may be defined to include memory so that a memory circuit is not separately provided. Network interface circuit 501 may be configured to provide communications with a core network of each VPLMN network. For example, network interface 501 may be configured to provide communication with a mobile switching center MSC 201a and/or a Signaling Gateway Supporting Node SGSN 201b of each VPLMN network MN1 and MN2.

According to some embodiments of inventive concepts, a DCP dummy connection may be established between a wireless device WD and initial registration node IRN of the cloud HPLMN network to provide provisioning connectivity for an eUICC wireless device WD. An eUICC solution may thus be enabled without using/needing a so-called eUICC provisioning subscription (see, Reference [1], GSMA Embedded SIM Remote Provisioning Architecture, Version 1.1, 17 Dec. 2013).

According to some embodiments of inventive concepts, a DCP dummy IMSI (International Mobile Subscriber Identity) is saved in the wireless device, and the DCP dummy IMSI is stored in the at the DCP cloud system. The DCP dummy IMSI is NOT a real IMSI and is NOT provisioned in VPLMN HLR. The dummy SIM (IMSI) number range is defined and managed by DCP dummy system, and it is NOT in any commercial IMSI number ranges from any existing operators today.

The DCP dummy IMSI (also referred to as a dummy IMSI number) can be used by the wireless device WD to attach to the network (and to DCP dummy HLR), and to set up a temporary PDP context (using DCP dummy APN, DCP, dummy PDP, etc.) or default dummy bearer with DCP dummy GGSN. The DCP dummy IMSI may only allow a provisioning bearer for remote subscription provisioning purposes, and not for normal traffic. The traffic restriction may be enforced using the DCP dummy APN, which may only allow traffic to and from the DCP dummy system, with no other sources (e.g., the Internet) being allowed.

A policy control (triggering) component may also be used/needed. When a 1st registration (location update request) is received at DCP dummy HLR, it may need to check predefined business rules such as: whether the mobile device has arrived in the destination country (PLMN MCC MNC ID=Destination MCC MNC ID) or just passing by an intermediate country; whether the device shall be re-provisioned with a localized subscription now, or later after a time period; which local MNO (e.g., mobile network operator MNO1 or MNO2) has a priority to be selected to provide the local subscription and download to the eUICC; and/or other pre-defined business rules.

Figure 6:
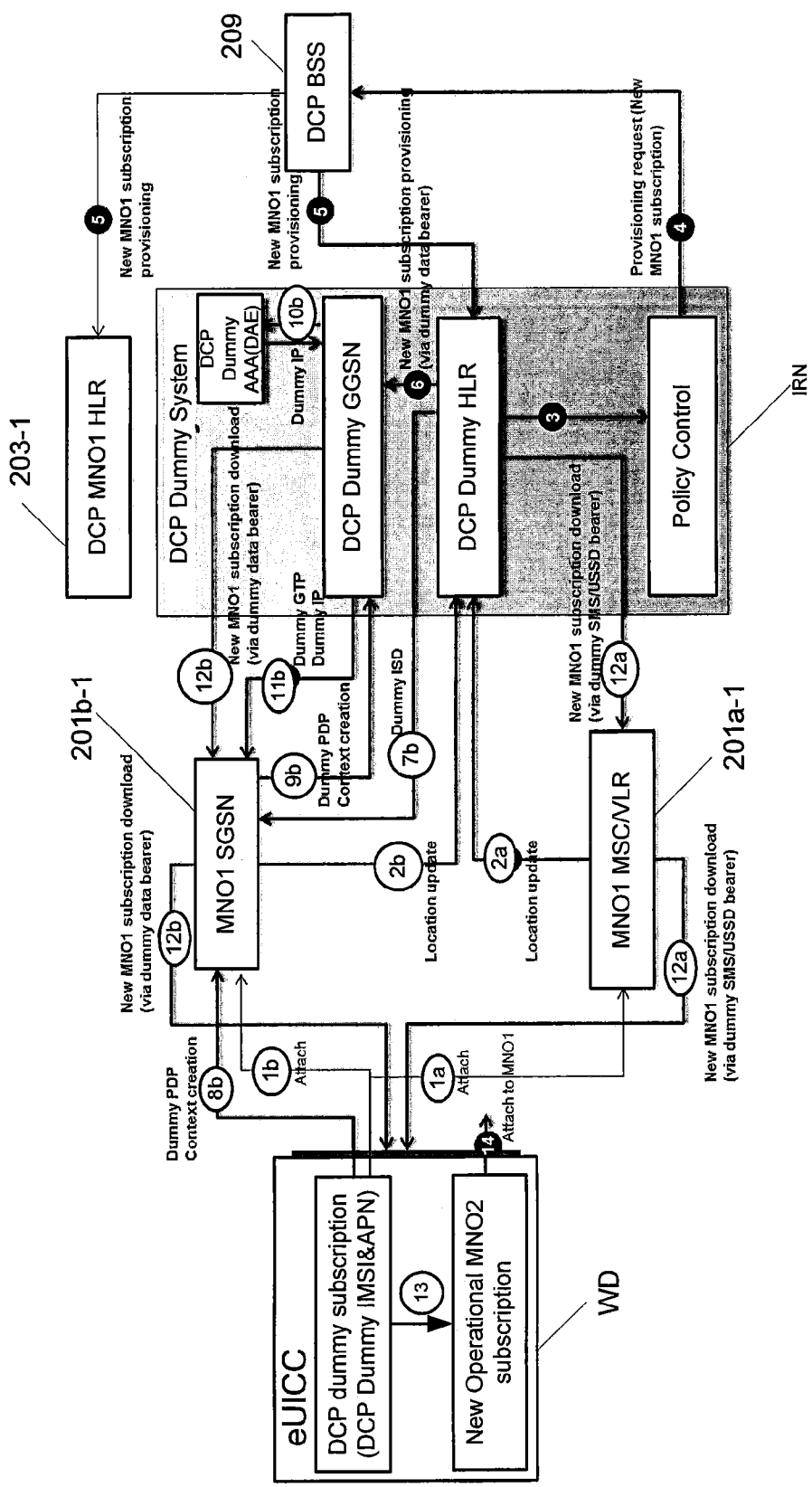
FIG. 6 is a schematic diagram illustrating operations of elements of FIGS. 1-5.

FIG. 6, is a block diagram illustrating significant elements of FIGS. 1-5 used to provide provisioning according to some embodiments of inventive concepts. In particular, FIG. 6 illustrates an eUICC wireless device WD, MSC 201a-1 of the first VPLMN network, SGSN 201b-1 of the first VPLMN network, initial registration node IRN (also referred to as DCP Dummy System), and DCP BSS (shown as cloud BSS in FIG. 1).

The initial registration node IRN (also referred to as DCP Dummy System) may include an IRN HLR (also referred to as DCP Dummy HLR), an IRN GGSN (also referred to as DCP Dummy GGSN), Policy Control Function, and IRN AAA (also referred to as DCP Dummy AAA). Those functions/modules can be implemented within one software node/server, referred to as an initial registration node or DCP Dummy System.

Embodiments of inventive concepts may be implemented using operations discussed in greater detail below with respect to FIG. 6. As noted above, a eUICC wireless device WD may be provisioned using a circuit switched connection through MSC 201a-1 or using a packet switched connection through SGSN 201b-1. Where operations refer to embodiments using a circuit switched connection through MSC 201a-1, the respective operation number may include the letter "a". Where operations refer to embodiments using a packet switched connection through SGSN 201b, the respective operation number may include the letter "b". If an operation number does not include either "a" or "b", the operation may be the same for both circuit switched and packet switched connections.

For provisioning to be performed according to embodiments of inventive concepts, the eUICC wireless device WD has a preloaded DCP dummy subscription that may be stored in memory 307 during its manufacture or during an initial personalization. eUICC wireless device is thus enabled with the DCP dummy subscription before it is provisioned with a new operational subscription(s) from a mobile network operator for a VPLMN. As shown in FIG. 6, the DCP dummy subscription may include a DCP dummy IMSI, a DCP dummy APN (Access Point Name), and dummy network access credentials.

According to some embodiments, a pool of dummy identifications (e.g., dummy IMSI's) may be maintained in IRN memory 507. When a eUICC wireless device is manufactured, the manufacturer may remotely fetch an available dummy identification from the pool of dummy identifications in IRN memory 507 for the eUICC device. The initial registration node IRN may thus control allocation of dummy identifications so that the same dummy identification is not allocated to two different wireless devices. On receipt of the dummy identification, the manufacturer may write/burn the dummy identification in wireless device memory 307. For example, the manufacturer may burn the dummy identification into a read only memory ROM portion of memory 307.

Operation 1a/1b. As discussed above, the eUICC wireless device is initially enabled with DCP dummy subscription before initiating provisioning with the first VPLMN. When the eUICC wireless device enters into a new country where MNO1 is a local operator the first VPLMN MN1, the eUICC wireless device attempts to attach to the local MNO1 network VPLMN MN1 (e.g., transmitting a CS domain attach request message to MNO1 MSC/VLR at operation 1a, or transmitting a PS domain attach request message to MNO1 SGSN at operation 1b) using the DCP dummy subscription information (that is included in the attach request message). The DCP dummy subscription information may include the dummy IMSI, dummy APN, dummy network access credentials, etc.

Operation 2a/2b. MNO1 MSC/VLR 201a-1 and/or SGSN 201b-1 may be configured to identify ranges of dummy IMSIs to determine when to route attach attempts (i.e., to route the attach request message) to initial registration node IRN. In a circuit switched embodiment, if the MSC 201a-1 determines that eUICC wireless device WD1 provided a dummy IMSI (in the range of known dummy IMSI numbers), MSC 201a-1 routes the attach/location update request message (also referred to as the location update message) to the DCP dummy HLR of the initial registration node at operation 2a. If the MSC 201a-1 determines that eUICC wireless device WD provided a real IMSI (outside the range of known dummy IMSI numbers), MSC 201a-1 routes the attach/location update request message (also referred to as the location update message) normally to VPLMN HLR 203-1. In a packet switched embodiment, if the SGSN 201b-1 determines that eUICC wireless device WD1 provided a dummy IMSI (in the range of known dummy IMSI numbers), SGSN 201b-1 routes the attach/location update request message (also referred to as the location update message) to the DCP dummy HLR of the initial registration node at operation 2b. If the MSC 201b-1 determines that eUICC wireless device WD1 provided a real IMSI (outside the range of known dummy IMSI numbers), MSC 201b-1 routes the attach/location update request normally to VPLMN HLR 203-1.

Operation 3. DCP dummy HLR of the initial registration node IRN is not a real HLR, because it may only implement special procedures according to some embodiments of inventive concepts. Once the location update request is received from MNO1 network MN1 (via operation 2a or 2b), the DCP dummy HLR may check with the local Policy Control function in the DCP dummy system IRN, to determine whether the location update will trigger a localization of operator subscription for the eUICC wireless device and re-provisioning a new local subscription to the eUICC wireless device. Policy Control function may make a decision based on predefined business rules/policies and the current PLMN (MCC/MNC) ID in the location update request (to know which country the device is located in and which MNO and which IMSI number it shall provision with).

Operation 4. If the Policy Control decision is true (i.e., the eUICC wireless device shall provision a new local MNO1 subscription for real traffic use), the policy control function will contact the DCP BSS system (an IT system) to handle the request to provision a new local MNO1 subscription. DCP BSS will select a local numbering (IMSI, MSISDN) from the local MNO1 numbering ranges.

Operation 5. DCP BSS will order and generate the new local MNO1 subscription (or select one existing subscription from the already pre-generated MNO1 subscriptions), provision the subscription into DCP MNO1 HLR 203-1, and also to DCP dummy system.

Operation 6. DCP dummy system will then form a subscription profile for the new MNO1 subscription to be downloaded to the eUICC wireless device WD, and the DCP dummy HLR then sends the new MNO1 subscription profile to eUICC wireless device WD to re-provision the eUICC wireless device WD with the new MNO1 subscription profile. DCP dummy HLR may have at least two ways to transport the new profile back to the eUICC wireless device WD, either via a data bearer through SGSN 201b-1 or via SMS/USSD bearer (SS7) through MSC 201a-1.

In case DCP dummy HLR has selected the SS7 bearer, the DCP dummy HLR can advance directly to Operation 12a below. According to some embodiments, if the initial attach is via MSC 201a-1 (circuit switched) at operation 1a, the new profile may be transmitted at operation 12a via MSC 201a-1.

In case DCP dummy HLR has selected the data bearer for transportation of new profile back to eUICC, the dummy HLR may first send the new profile data to the DCP dummy GGSN (DCP dummy GGSN and dummy HLR may coexist in one software node—DCP dummy system or server). Then it continues with the following steps. According to some embodiments, if the initial attach is via SGSN 201b-1 (packet switched) at operation 1b, the new profile may be transmitted via SGSN 201b-1 as discussed below with respect to operations 7b, 8b, 9b, 10b, 11b, and 12b.

Operation 7b. DCP dummy HLR may send a dummy "InsertSubscriberData" message to MNO1 SGSN 201b-1 in response to the location update request. The dummy "InsertSubscriberData" message is not a real "InsertSubscriberData" message as specified in the 3GPP standard or any real products, but only includes a few parameters that are used/required to set up the dummy PDP (Packet Data Protocol) context (also referred to as a PDP connection) between eUICC wireless device WD1 and the network, such as DCP dummy APN, and dummy IMSI.

Operation 8b. MNO1 SGSN 201b-1 may then send an attach accept message to eUICC wireless device WD1, indicating that the network has accepted the device attach request (of operation 1b), and also indicating that the network wants to set up a PDP context (also referred to as a PDP connection) with the eUICC wireless device (and/or SGSN 201b-1 may also send a SMS trigger to trigger the eUICC wireless device to set up PDP context). So when receiving the attach accept message (and/or the SMS trigger request), eUICC wireless device may start the PDP Context Creation Request towards the network, by using the Dummy IMSI and Dummy APN provided in the eUICC Dummy Subscription.

Operation 9b. MNO1 SGSN 201b-1 may receive the PDP context creation request, and may send the PDP context request towards DCP Dummy GGSN by querying the MNO1 DNS (Domain Name Server) which resolves the subscriber's dummy APN name to the DCP dummy GGSN IP address (MNO1 DNS may need to provision the DCP dummy GGSN IP address and dummy APN name in its own DNS record, or the MNO1 DNS can delegate the DNS query request to DCP DNS to resolve from the dummy APN name to the DCP dummy GGSN IP address).

Operation 10b. DCP dummy GGSN receives the PDP context request message from MNO1 SGSN 201b-1, and based on configured dummy APN, the Dummy GGSN may issue a request to the DCP dummy AAA (Radius) server to ask for a dummy IP address to be assigned to the eUICC wireless device. DCP dummy AAA server may maintain an IP address pool and allocate a dummy IP address based on the dummy IMSI and respond back with the dummy IP address assigned to the device through dummy GGSN and MNO1 SGSN.

Operation 11b. Once eUICC wireless device WD1 has been assigned dummy IP address, a GTP (GPRS Tunneling Protocol) tunnel may be established between MNO1 SGSN 201b-1 and DCP dummy GGSN, and the dummy PDP connection (dummy data bearer) may be established between eUICC wireless device and dummy GGSN.

Operation 12a. If providing subscription download using SS7 bearer (SMS/USSD) through MSC 201a-1, the MNO1 MSC/VLR 201a-1 receives the subscription profile data via SS7 signaling from DCP dummy HLR, and forwards the subscription profile data through SS7 signaling to eUICC wireless device WD.

Operation 12b. If providing subscription download over SGSN 201b-1, DCP dummy GGSN can push the new MNO1 profile data to the device, through the established dummy data bearer between dummy GGSN and eUICC wireless device (through SGSN 201b-1) per operation 12b, or eUICC wireless device can trigger to download the subscription data from the dummy network. Note that the only traffic allowed through DCP dummy GGSN is the eUICC subscription provisioning traffic (e.g., download & enable new subscription), and all other traffic may be blocked. This traffic restriction may be achieved by setting restrictions on the DCP dummy APN so that only traffic to and from DCP dummy system is allowed via this APN, and DCP Dummy System may only generate the subscription provisioning request (e.g. download/enable/disable/delete subscriptions).

Operation 13. When receiving the new MNO1 subscription profile from the network at eUICC wireless device, eUICC wireless device may save the new MNO1 subscription profile in memory 307 and enable the new MNO1 subscription profile and disable the DCP dummy profile, and make a new attachment to the MNO1 network using the new MNO1 subscription profile (including the new MNO1 IMSI). Even though the DCP dummy profile is disabled, eUICC wireless device may maintain the DCP dummy profile in memory 307.

Operation 14. The eUICC wireless device is now attached to the local MNO1 network using a local MNO1 subscription. The subscription provisioning process has now been completed.

According to some embodiments, the mobile network operator subscription profile may include some or all of the following information: IMSI (International Mobile Subscriber Identity), ICCID (Integrated Circuit Card Identifier), network access credentials, PIN (Personal Identification Number), PUK (Personal Unblocking Code), APN (Access Point Name), etc.

The DCP dummy subscription can also be used as fall back subscription for eUICC wireless device, in the event of eUICC wireless device connectivity failure at anytime and/or anywhere. The DCP dummy profile may be enabled automatically to always allow the eUICC wireless device to be attached and connected to the DCP dummy system, so that the eUICC wireless device can be remotely provisioned with new operational subscription from the network at any time if/when needed, using the same procedure as described above.

The DCP dummy subscription can also be used for eUICC wireless device fallback purposes during an entire lifecycle of the eUICC wireless device. For example, the DCP dummy subscription can be used as discussed above after factory testing is completed and factory testing subscription has been deleted from the eUICC wireless device and network but before any operational subscription has been provisioned & installed to eUICC wireless device. The eUICC wireless device can also fall back to the DCP dummy subscription to regain temporary connectivity from DCP dummy system for later remote provisioning of new operational subscription into the eUICC wireless device after an initial remote provisioning, without generating any/significant cost during this period and without having to ship the eUICC wireless device back to the manufacturer factory for re-provisioning (as may typically occur if the eUICC wireless device loses active connectivity).

According to embodiments disclosed herein, there may be no need to have a provisioning subscription in the eUICC wireless device that is known to a mobile network operator of a mobile network, and no need for mobile network operators to always keep a provisioning subscription active in the network (HLR). Use of the limited IMSI/MSISDN numbering resources, use of HLR space, and/or licensing cost may be reduced. Accordingly, connectivity costs for both operators and enterprise customers may be reduced.

Commercial value for DCP may thus be provided if all wireless devices (e.g., eUICC wireless devices) are provided with DCP Dummy subscription information (including a dummy IMSI) during manufacture or initial personalization. A eUICC wireless device can later be personalized and/or re-provisioned with a new local operator subscription anytime/anywhere using DCP dummy connectivity as discussed above. As discussed above, a partner (local) MNO may route the attach messages for those pre-defined DCP dummy IMSIs from their MSC/VLR and/or SGSN to DCP dummy HLR. The DCP may thus provide commercial value because all wireless devices (e.g., eUICC wireless devices) may be initially under control of the DCP platform through the DCP dummy SIM, and also, the new operational MNO subscriptions may be provisioned from the DCP platform (through dummy connectivity system) rather than DCP competitor platforms. Accordingly, the new MNO operational subscriptions may also be provisioned into the DCP platform rather than competitor platforms. DCP may thus gain more subscribers than today.

Moreover, by providing the that DCP dummy connection is always active at the DCP and that the dummy subscription information is always maintained at the eUICC wireless device, connectivity for the eUICC wireless device may always be provided using a DCP dummy connection as discussed above.

Figure 7:
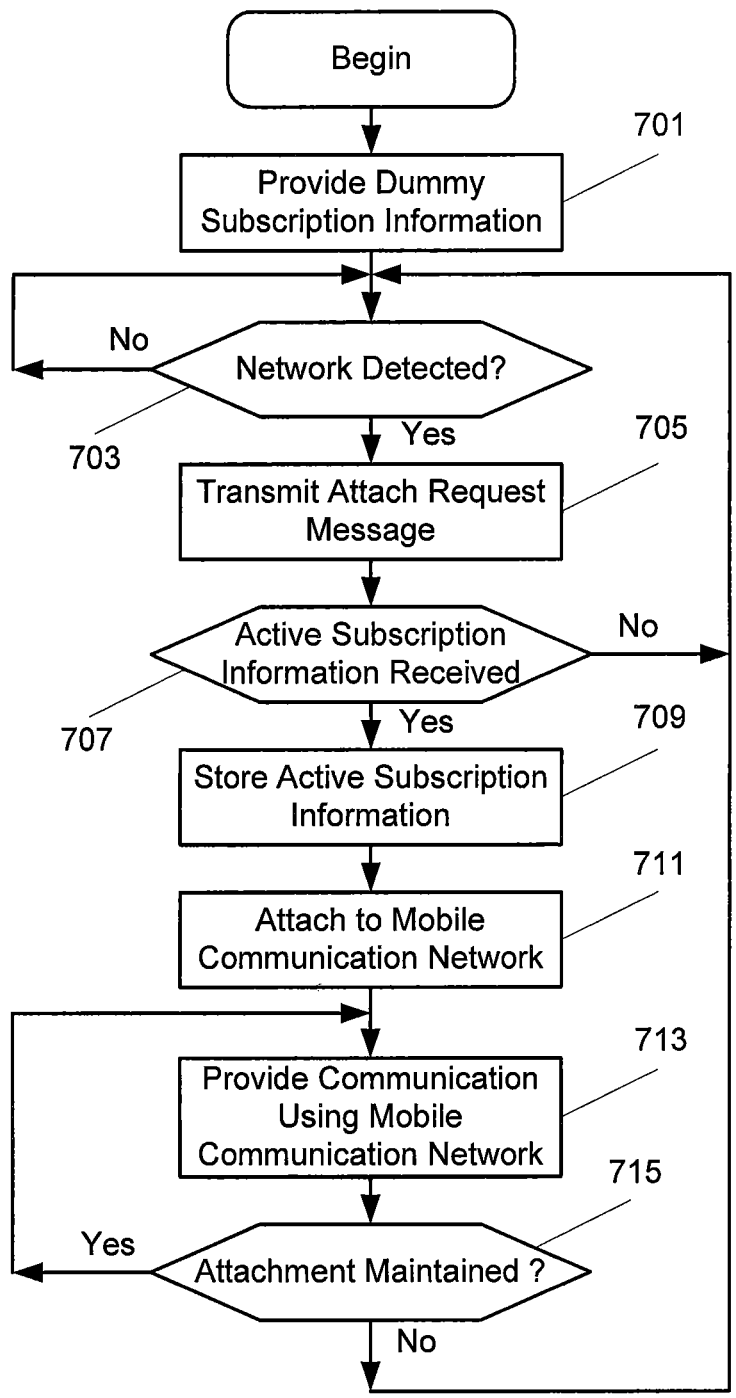

Operations of wireless device WD will now be discussed in greater detail below with respect to the flow chart of FIG. 7. As discussed above, dummy subscription information may be provided in memory 307 at block 701. The dummy subscription information may be saved in memory 307 during manufacture of the wireless device or a card/circuit thereof, or the dummy subscription information may be provided in memory during an initial personalization of the wireless device. The dummy subscription information may include a dummy identification (e.g., a dummy International Mobile Subscriber Identity or dummy IMSI) for the wireless device. The dummy subscription information may also include a dummy access point name (APN) and/or dummy network credentials.

At block 703, processor 303 may wait until a mobile communication network MN1 is detected (e.g., responsive to detecting control signaling from the mobile communication network through transceiver 301). Upon detecting a mobile communication network MN1 at block 703, processor 303 may transmit an attach request message through transceiver 301 over a radio interface to the mobile communication network at block 705, and the attach request message may include the dummy subscription information.

If active subscription information (different than the dummy subscription information) for the mobile communication network MN1 is received over the radio interface from the mobile communication network MN1 at block 707, processor 303 may store the active subscription information for the mobile communication network MN1 in memory (307) at block 709. The active subscription information may include an active identification (e.g., an active International Mobile Subscriber Identity or active IMSI) for the wireless device, with the dummy identification and the active identification being different. The active subscription information may also include an Integrated Circuit Card Identifier (ICCID), network credentials for the mobile communication network MN1, a Personal Identification Number (PIN), a Personal Unblocking Code (PUK), and/or an Access Point Name (APN) for the mobile communication network MN1.

After receiving and/or storing the active subscription information, processor 303 may attach through transceiver 301 to the mobile communication network MN1 over the radio interface using the active subscription information at block 711. Communications may thus be provided for the wireless device WD using the mobile communication network MN1 at block 713 as long at the attachment is maintained at block 715. Attaching to the mobile communication network MN1 using the active subscription information may include enabling the active subscription information for the mobile communication network MN1 and disabling the dummy subscription information while maintaining the dummy subscription information in memory 307.

If the attachment to the mobile communication network MN1 is lost at block 715, processor 303 may return to block 703 until another network is detected. As shown in FIG. 1, wireless device WD may move from an area covered by mobile communication network MN1 and into an area covered by mobile communication network MN2. Accordingly, attachment to mobile communication network MN1 may be lost for some threshold period of time at block 715, and processor 303 may thus return to block 703 to monitor for a network. Responsive to detecting a second mobile communication network MN2 at block 703, processor 303 may transmit a second attach request message over a radio interface to the second mobile communication network MN2 at block 705, with the second attach request message including the dummy subscription information. Processor 303 may thus repeat operations of blocks 707, 709, 711, 713, and 715 for the second mobile communication network MN2 to receive and store active subscription information for the second mobile communication network MN2, to attach to the second mobile communication network MN2, and to provide communication using the second communication network.

According to some embodiments discussed above with respect to operations 1a, 2a, and 12a of FIG. 6, processor 303 may receive the active subscription information through transceiver 301 over the radio interface using a circuit switched connection (e.g., using SS7 signaling). According to such embodiments, the attached request message of block 705 may be a domain attach request message for a circuit switched connection.

According to some other embodiments discussed above with respect to operations 1b, 2b, 7b, 8b, 9b, 10b, 11b, and 12b of FIG. 6, processor 303 may receive the active subscription information through transceiver 301 over the radio interface using a packet switched connection. According to such embodiments, the attach request message of block 705 may be a domain attach request message for a packet switched connection. For example, receiving the active subscription message at block 707 may include processor 303 receiving an attach accept message from the mobile communication network over the radio interface (with the attach accept message being responsive to the attach request message) before receiving the active subscription information, and then establishing a Packet Data Protocol (PDP) connection using the dummy subscription information. Processor 303 can then receive the active subscription information over the radio interface using the PDP connection.

Operations of mobile communication network MN1 will now be discussed in greater detail below with respect to the flow chart of FIG. 8. As discussed in greater detail below, operations of FIG. 8 may be performed at a node of the core network of mobile communication network MN1 of FIG. 1. The core network node may be a mobile switching center MSC 201a-1 of network MN1 or a SGSN 201b-1 of network MN1, and embodiments of such a core network node (including network interface 401, processor 403, and memory 407) are illustrated generically in the block diagram of FIG. 4. For example, MSC 201a-1 may support a circuit switched connection between wireless device WD and initial registration node IRN, and/or SGSN 201b-1 may support a packet switched connection between wireless device WD and IRN.

At block 801, definition of a set of dummy identifications (e.g., dummy IMSI's) may be stored in memory 407. For example, a range identification numbers may be defined for dummy identifications to allow processor 403 to quickly identify attach requests from wireless devices for which active subscriptions with the mobile communication network have not yet been established.

An attach request message may be received from wireless device WD through radio access network RAN1 and transceiver 401 at block 803, and the attach request message may include subscription information (either dummy or active subscription information) including an identification for the wireless device (either a dummy or active identification).

Once an attach request message is received from the wireless device through the radio access network RAN1 and network interface 401 at block 803, processor 403 may determine if an identification provided in the request message is included in the set of dummy identifications (discussed above) at block 804. If the identification is not in the set of dummy identifications (such that the wireless device has an active subscription with network MN1) at block 804, processor 403 may proceed to provide communications based on the active subscription for the wireless device at block 821 through network interface 401 and radio access network RAN1 using the active subscription in local home location register (HLR) 203-1.

If the identification is in the set of dummy identifications (such that the wireless device does not have an active subscription with network MN1) at block 804, processor 403 may transmit a location update message (also referred to as routing the attach request message) through network interface 401 to initial registration node IRN at block 805. The location update message my include the dummy subscriber information from the attach request message.

After transmitting the location update message to the initial registration node IRN, processor 403 may receive active subscription information from the initial registration node IRN through network interface 401 at block 807, and at block 809, processor 403 may transmit the active subscription information through network interface 403 and radio access network RAN1 to the wireless device WD. After transmitting the active subscription information, processor 403 may accept attachment of the wireless device using the active subscription information at block 811.

As discussed above, the core network node according to some embodiments may be a mobile switching center MSC 201a-1 providing a circuit switched connection between wireless device WD and initial registration node IRN (as discussed above with respect to operations 1a, 2a, and 12a). Accordingly, processor 403 may receive and transmit the active subscription information over a circuit switched connection (e.g., using SS7 signaling). According to such embodiments, processor 403 may establish a circuit switched (CS) connection between the wireless device WD and the initial registration node IRN through network interface 401. Accordingly, processor 403 may receive the active subscription information from the initial registration node (through network interface 401) over the circuit switched connection, and processor 403 may transmit the active subscription information through the network interface over the circuit switched connection to the wireless device WD. Moreover, the attach request message may be a domain attach request message for a circuit switched connection.

According to some other embodiments, the core network node may be an SGSN 201b-1 providing a packet switched connection between wireless device WD and initial registration node IRN (as discussed above with respect to operations 1b, 2b, 7b, 8b, 9b, 10b, 11b, and 12b). Accordingly, processor 403 may receive and transmit the active subscription information over a packet switched connection (through network interface 401). In such embodiments, the dummy subscription information may include a dummy International Mobile Subscriber Identity (IMSI) and a dummy Access Point Name APN, and processor 403 may establish a Packet Data Protocol PDP connection (also referred to as a PDP context) between the wireless device WD and the initial registration node IRN (through network interface 401) based on the dummy IMSI and the dummy APN. Accordingly, processor 403 may receive and transmit the active subscription information over the PDP connection. Moreover, establishing the PDP connection may include processor 403 transmitting an attach accept message through network interface 401 and radio access network RAN1 to wireless device WD, with the attach accept message being responsive to the attach request message. Moreover, the attach request message may be a domain attach request message for a packet switched connection.

As shown in FIG. 1, the initial registration node IRN may be outside the mobile communication network MN1. The core network node (e.g., SGSN or MSC) may be coupled to the initial registration node IRN of the DCP cloud through respective IP routers (IPRs) as shown in FIG. 1.

As discussed above with respect to FIG. 7, the dummy subscription information may include a dummy identification (e.g., a dummy IMSI) for the wireless device WD, the active subscription information may include an active identification (e.g., an active IMSI) for the wireless device WD, and the dummy identification and the active identification may be different. The dummy subscription information may include a dummy access point name APN and/or dummy network credentials. The active subscription information may include an Integrated Circuit Card Identifier ICCID, network credentials for the mobile communication network MNS, a Personal Identification Number PIN, a Personal Unblocking Code PUK, and/or an Access Point Name APN for the mobile communication network MN1.

In addition, the active subscription information may be stored in a Home Location Register HLR 203-1 of the mobile communication network MN1. Accordingly, attachment of the wireless device WD may be based on the active subscription information in HLR 203-1.

Operations of initial registration node IRN will now be discussed in greater detail below with respect to the flow chart of FIG. 9. As shown in FIG. 5, initial registration node IRN may include processor 503, network interface 501, and memory 507, with memory 507 including computer readable program code that when executed by processor 503 causes processor 503 to perform operations according to embodiments disclosed herein. While FIG. 6 shows examples of modules of program code according to some embodiments, the following discussion of FIG. 9 will focus on operations of processor 503.

At block 901, dummy subscription information for a plurality of wireless devices may be provided in memory 507. The dummy subscription information for each wireless device may match dummy subscription information that is saved in the respective wireless device when manufactured and/or during initial personalization of the wireless device.

At block 903, processor 503 may receive a location message for wireless device WD through mobile communication network MN1, and the location update message may include dummy subscription information with a dummy identification for the wireless device WD. Responsive to receiving the location update message at block 903, processor 503 may determine (based on the dummy subscription information from wireless device WD) if wireless device WD is authorized for an active subscription with mobile network MN1. The location update message from mobile network MN1, for example, may include an identification of mobile network MN1 in addition to an identification of wireless device WD, and processor 503 may determine if wireless device WD is authorized for subscription with mobile network MN1.

Responsive to wireless device WD being authorized at block 905, processor 503 may generate a request for active subscription information for wireless device WD at block 907, and obtain the active subscription information at block 909. As discussed above according to some embodiments, the request for active subscription information may be transmitted to business support system 209, and business support system 209 may reply with active subscription information that is received through network interface 501 at processor 503. Accordingly, processor 503 may obtain/receive the active subscription information for wireless device WD through network interface 501 at block 909. In addition, business support system and/or initial registration node may transmit the active subscription information for wireless device WD to mobile network HLR 203-1.

At block 911, processor 502 may transmit the active subscription information through network interface 501 and mobile communication network MN1 to wireless device WD.

According to some embodiments, processor 503 may transmit the active subscription information through network interface 501 and mobile communication network MN1 to wireless device WD over a packet switched connection. In such embodiments, the dummy subscription information may include a dummy International Mobile Subscriber Identity IMSI and a dummy Access Point Name APN. Transmitting the active subscription information may thus include processor 503 establishing a Packet Data Protocol PDP connection through network interface 501 and mobile communication network MN1 between wireless device WD and initial registration node IRN based on the dummy IMSI and the dummy APN, and transmitting the active subscription information over the PDP connection.

According to some other embodiments, processor 503 may transmit the active subscription information through network interface 501 and mobile communication network MN1 to wireless device WD over a circuit switched connection (e.g., using SS7 signaling). According to such embodiments, before transmitting the active subscription information, processor 501 may establish a circuit switched CS connection through network interface 501 and mobile communication network MN1 between wireless device WD and initial registration node IRN before transmitting the active subscription information.

EXAMPLE EMBODIMENTS

Embodiment 1

A method of operating a wireless device wherein the wireless device includes memory (307) with dummy subscription information stored therein, the method comprising: transmitting (705) an attach request message over a radio interface to a mobile communication network, wherein the attach request message includes the dummy subscription information; after transmitting the attach request message, receiving (707) active subscription information for the mobile communication network over the radio interface, wherein the active subscription information is different than the dummy subscription information; and storing (709) the active subscription information for the mobile communication network in memory (307).

Embodiment 2

The method of Embodiment 1 further comprising:
after receiving the active subscription information, attaching (711) to the mobile communication network over the radio interface using the active subscription information.

Embodiment 3

The method of Embodiment 2 wherein attaching to the mobile communication network using the active subscription information comprises enabling the active subscription information for the mobile communication network and disabling the dummy subscription information while maintaining the dummy subscription information in memory.

Embodiment 4

The method of any of Embodiments 1-3 wherein receiving the active subscription information comprises receiving the active subscription information over the radio interface using a circuit switched connection.

Embodiment 5

The method of any of Embodiments 1-4 wherein receiving the active subscription information comprises receiving the active subscription information over the radio interface using SS7 signaling.

Embodiment 6

The method of any of Embodiments 1-3 wherein receiving the active subscription information comprises receiving the active subscription information over the radio interface using a packet switched connection.

Embodiment 7

The method of any of Embodiments 1-3 or 6 further comprising: before receiving the active subscription information, receiving an attach accept message from the mobile communication network over the radio interface, wherein the attach accept message is responsive to the attach request message; and after receiving the attach accept message, establishing a Packet Data Protocol (PDP) connection using the dummy subscription information, wherein receiving the active subscription information comprises receiving the active subscription information over the radio interface using the PDP connection.

Embodiment 8

The method of any of Embodiments 1-7 wherein the dummy subscription information includes a dummy identification for the wireless device, wherein the active subscription information includes an active identification for the wireless device, and wherein the dummy identification and the active identification are different.

Embodiment 9

The method of Embodiment 8 wherein the dummy identification comprises a dummy International Mobile Subscriber Identity (IMSI), wherein the active identification comprises an active IMSI, and wherein the dummy IMSI and the active IMSI are different.

Embodiment 10

The method of any of Embodiments 1-9 wherein the dummy subscription information includes a dummy access point name (APN) and/or dummy network credentials.

Embodiment 11

The method of any of Embodiments 1-10 wherein the active subscription information includes an Integrated Circuit Card Identifier (ICCID), network credentials for the mobile communication network, a Personal Identification Number (PIN), a Personal Unblocking Code (PUK), and/or an Access Point Name (APN) for the mobile communication network.

Embodiment 12

The method of any of Embodiments 1-11 wherein the attach request message comprises a domain attach request message for a circuit switched connection.

Embodiment 13

The method of any of Embodiments 1-11 wherein the attach request message comprises a domain attach request message for a packet switched connection.

Embodiment 14

The method of any of Embodiments 1-13 wherein mobile communication network comprises a first mobile communication network, and wherein the active subscription information for the mobile communication network comprises first active subscription information for the first mobile communication network, the method further comprising: after storing the first active subscription information for the mobile communication network, transmitting (705) a second attach request message over a radio interface to a second mobile communication network, wherein the second attach request message includes the dummy subscription information; after transmitting the second attach request message, receiving (707) second active subscription information for the second mobile communication network over the radio interface, wherein the second active subscription information is different than the dummy subscription information; and storing (709) the second active subscription information for the second mobile communication network in memory (307).

Embodiment 15

The method of Embodiment 14 wherein transmitting the second attach request message comprises transmitting the second attach request message responsive to failure communicating with the first mobile communication network.

Embodiment 16

A mobile device comprising: a transceiver (301) configured to transmit uplink radio communications over a radio interface to a mobile network and to receive downlink radio communications over the radio interface from the mobile network; memory (307) with dummy subscription information stored therein, wherein the dummy subscription information includes a dummy identification (IMSI) for the mobile device; and a processor (301) coupled with the transceiver and the memory, wherein the processor is configured to, transmit an attach request message through the transceiver to a mobile communication network, wherein the attach request message includes the dummy subscription information; receive active subscription information for the mobile communication network after transmitting the attach request message, wherein the active subscription information is different than the dummy subscription information, and wherein the active subscription information is received through the transceiver; and store the active subscription information in memory (307).

Embodiment 17

The mobile device of Embodiment 16 wherein the processor is further configured to perform operations of any of Embodiments 2-15.

Embodiment 18

A method of operating a mobile communication network, the method comprising: receiving (803) an attach request message from a wireless device, wherein the attach request message includes dummy subscription information with a dummy identification for the wireless device; routing (805) a location update message to an initial registration node (IRN) wherein the location update message includes the dummy subscription information for the wireless device; after routing the location update message to the initial registration node, receiving (807) active subscription information from the initial registration node (IRN); and transmitting (809) the active subscription information to the wireless device.

Embodiment 19

The method of Embodiment 18 further comprising: after transmitting the active subscription information, accepting (811) attachment of the wireless device using the active subscription information.

Embodiment 20

The method of any of Embodiments 19-20, wherein the dummy subscription information includes a dummy International Mobile Subscriber Identity (IMSI) and a dummy Access Point Name (APN), wherein receiving the active subscription information includes establishing a Packet Data Protocol (PDP) connection between the wireless device and the initial registration node (IRN) based on the dummy IMSI and the dummy APN, wherein receiving the active subscription information comprises receiving the active subscription information over the PDP connection, and wherein transmitting the active subscription information comprises transmitting the active subscription information over the PDP connection.

Embodiment 21

The method of Embodiment 20 wherein establishing the PDP connection include transmitting an attach accept message to the wireless device, wherein the attach accept message is responsive to the attach request message.

Embodiment 22

The method of any of Embodiments 18-21 wherein receiving the active subscription information comprises receiving the active subscription information over a packet switched connection, and wherein transmitting the active subscription information comprises transmitting the active subscription information over the packet switched connection.

Embodiment 23

The method of any of Embodiments 18-19 wherein receiving the active subscription information includes establishing a circuit switched (CS) connection between the wireless device and the initial registration node (IRN) and receiving the active subscription information from the initial registration node over the circuit switched connection, and wherein transmitting the active subscription information comprises transmitting the active subscription information over the circuit switched connection to the wireless device.

Embodiment 24

The method of Embodiment 23 wherein receiving the active subscription information comprises receiving the active subscription information using SS7 signaling, and wherein transmitting the active subscription information comprises transmitting the active subscription information using SS7 signaling.

Embodiment 25

The method of any of Embodiments 18-24 wherein routing the location update message to the initial registration node comprises routing the location update message responsive to determining that the dummy identification is a dummy identification number in a set of defined dummy identification numbers.

Embodiment 26

The method of any of Embodiments 18-25 wherein the initial registration node is outside the mobile communication network.

Embodiment 27

The method of any of Embodiments 18-26 wherein the dummy subscription information includes a dummy identification for the wireless device, wherein the active subscription information includes an active identification for the wireless device, and wherein the dummy identification and the active identification are different.

Embodiment 28

The method of Embodiment 27 wherein the dummy identification comprises a dummy International Mobile Subscriber Identity (IMSI), wherein the active identification comprises an active IMSI, and wherein the dummy IMSI and the active IMSI are different.

Embodiment 29

The method of any of Embodiments 18-28 wherein the dummy subscription information includes a dummy access point name (APN) and/or dummy network credentials.

Embodiment 30

The method of any of Embodiments 18-29 wherein the active subscription information includes an Integrated Circuit Card Identifier (ICCID), network credentials for the mobile communication network, a Personal Identification Number (PIN), a Personal Unblocking Code (PUK), and/or an Access Point Name (APN) for the mobile communication network.

Embodiment 31

The method of any of Embodiments 18-30 wherein the attach request message comprises a domain attach request message for a circuit switched connection.

Embodiment 32

The method of any of Embodiments 18-30 wherein the attach request message comprises a domain attach request message for a packet switched connection.

Embodiment 33

The method of any of Embodiments 18-32 further comprising: storing the active subscription information in a Home Location Register (HLR) of the mobile communication network.

Embodiment 34

A node of a mobile communication network, the node comprising: a network interface (401) configured to provide communication with a wireless device through a radio access network and configured to provide communication with an initial registration node (IRN) outside the communication network; and a processor (403) coupled with the network interface, wherein the processor is configured to, receive an attach request message through the network interface and the radio access network from a wireless device, wherein the attach request message includes dummy subscription information with a dummy identification for the wireless device, route a location update message through the network interface to an initial registration node (IRN), receive active subscription information through the network interface from the initial registration node (IRN) after routing the location update message to the initial registration node, and transmit the active subscription information through the network interface and the radio access network to the wireless device.

Embodiment 35

The node of Embodiment 34 wherein the node comprises a mobile switching center (201a-1), wherein the processor is configured to receive and transmit the active subscription information over a circuit switched connection between the wireless device and the initial registration node (IRN).

Embodiment 36

The node of Embodiment 34 wherein the node comprises a Service GPRS Support Node (201a-1), wherein the processor is configured to receive and transmit the active subscription information over a packet switched connection between the wireless device and the initial registration node (IRN).

Embodiment 37

The node of Embodiments 34 wherein the processor is further configured to perform operations of any of Embodiments 19-33.

Embodiment 38

A method of operating an initial registration node (IRN), the method comprising: receiving (903) a location update message for a wireless device from a mobile communication network, wherein the location update message includes dummy subscription information with a dummy identification for the wireless device; responsive to receiving the location update message, obtaining (909) active subscription information for the wireless device; and transmitting (911) the active subscription information through the mobile communication network to the wireless device.

Embodiment 39

The method of Embodiment 38, wherein the dummy subscription information includes a dummy International Mobile Subscriber Identity (IMSI) and a dummy Access Point Name (APN), wherein transmitting the active subscription information includes establishing a Packet Data Protocol (PDP) connection through the mobile communication network between the wireless device and the initial registration node (IRN) based on the dummy IMSI and the dummy APN, and transmitting the active subscription information over the PDP connection.

Embodiment 40

The method of any of Embodiments 38-39 wherein transmitting the active subscription information comprises transmitting the active subscription information through the mobile communication network to the wireless device over a packet switched connection.

Embodiment 41

The method of Embodiment 38 further comprising: before transmitting the active subscription information, establishing a circuit switched (CS) connection through the mobile communication network between the wireless device and the initial registration node (IRN), wherein transmitting the active subscription information comprises transmitting the active subscription information over the circuit switched connection through the mobile communication network to the wireless device.

Embodiment 42

The method of Embodiment 41 wherein transmitting the active subscription information comprises transmitting the active subscription information through the mobile communication network to the wireless device using SS7 signaling.

Embodiment 43

The method of any of Embodiments 38-42 wherein the initial registration node is outside the mobile communication network.

Embodiment 44

The method of any of Embodiments 38-43 wherein the dummy subscription information includes a dummy identification for the wireless device, wherein the active subscription information includes an active identification for the wireless device, and wherein the dummy identification and the active identification are different.

Embodiment 45

The method of Embodiment 44 wherein the dummy identification comprises a dummy International Mobile Subscriber Identity (IMSI), wherein the active identification comprises an active IMSI, and wherein the dummy IMSI and the active IMSI are different.

Embodiment 46

The method of any of Embodiments 38-45 wherein the dummy subscription information includes a dummy access point name (APN) and/or dummy network credentials.

Embodiment 47

The method of any of Embodiments 38-46 wherein the active subscription information includes an Integrated Circuit Card Identifier (ICCID), network credentials for the mobile communication network, a Personal Identification Number (PIN), a Personal Unblocking Code (PUK), and/or an Access Point Name (APN) for the mobile communication network.

Embodiment 48

The method of any of Embodiments 38-47 further comprising: transmitting the active subscription information to a Home Location Register (HLR) of the mobile communication network.

Embodiment 49

The method of any of Embodiments 38-48 further comprising: responsive to receiving the location update message, generating (907) a request for provisioning information for the wireless device; wherein obtaining the active subscription information comprises receiving (909) active subscription information for the wireless device after generating the request for provisioning information for the wireless device.

Embodiment 50

An initial registration node (IRN) comprising: a network interface (501) configured to provide communication with a mobile communication network; and a processor (503) coupled with the network interface, wherein the processor is configured to, receive a location update message for a wireless device from a mobile communication network, wherein the location update message includes dummy subscription information with a dummy identification for the wireless device; obtain active subscription information for the wireless device responsive to receiving the location update message; and transmit the active subscription information through the mobile communication network to the wireless device.

Embodiment 51

The initial registration node of Embodiments 50 wherein the processor is further configured to perform operations of any of Embodiments 39-49.

Embodiment 52

A mobile device comprising: an interface unit (301) adapted to transmit uplink radio communications over a radio interface to a mobile network and to receive downlink radio communications over the radio interface from the mobile network; a memory unit (307) with dummy subscription information stored therein, wherein the dummy subscription information includes a dummy identification (IMSI) for the mobile device; and a processor unit (301) coupled with the transceiver unit and the memory unit, wherein the processor unit is adapted to, transmit an attach request message through the interface unit to a mobile communication network, wherein the attach request message includes the dummy subscription information; receive active subscription information for the mobile communication network after transmitting the attach request message, wherein the active subscription information is different than the dummy subscription information, and wherein the active subscription information is received through the interface unit; and store the active subscription information in memory (307).

Embodiment 53

The mobile device of Embodiment 52 wherein the processor unit is further adapted to perform operations of any of Embodiments 2-15.

Embodiment 54

A node of a mobile communication network, the node comprising: an interface unit (401) adapted to provide communication with a wireless device through a radio access network and adapted to provide communication with an initial registration node (IRN) outside the communication network; and a processor unit (403) coupled with the interface unit, wherein the processor unit is adapted to, receive an attach request message through the interface unit and the radio access network from a wireless device, wherein the attach request message includes dummy subscription information with a dummy identification for the wireless device, route a location update message through the interface unit to an initial registration node (IRN), receive active subscription information through the interface unit from the initial registration node (IRN) after routing the location update message to the initial registration node, and transmit the active subscription information through the interface unit and the radio access network to the wireless device.

Embodiment 55

The node of Embodiment 54 wherein the node comprises a mobile switching center (201*a*-1), wherein the processor unit is adapted to receive and transmit the active subscription information over a circuit switched connection between the wireless device and the initial registration node (IRN).

Embodiment 56

The node of Embodiment 54 wherein the node comprises a Service GPRS Support Node (201a-1), wherein the processor unit is adapted to receive and transmit the active subscription information over a packet switched connection between the wireless device and the initial registration node (IRN).

Embodiment 57

The node of and of Embodiments 54-56 wherein the processor unit is further adapted to perform operations of any of Embodiments 19-33.

Embodiment 58

An initial registration node (IRN) comprising: an interface unit (501) adapted to provide communication with a mobile communication network; and a processor unit (503) coupled with the interface unit, wherein the processor unit is adapted to, receive a location update message for a wireless device through the interface unit from a mobile communication network, wherein the location update message includes dummy subscription information with a dummy identification for the wireless device; obtain active subscription information for the wireless device responsive to receiving the location update message; and transmit the active subscription information through the interface unit and the mobile communication network to the wireless device.

Embodiment 59

The initial registration node of Embodiments 58 wherein the processor unit is further configured to perform operations of any of Embodiments 39-49.

ABBREVIATIONS

SMS: short messaging service
ISD: Insert Subscriber Data (message between HLR and SGSN/MSC)
USSD: Unstructured Supplementary Service Data
IMSI: International Mobile Subscriber
eUICC: embedded UICC
AAA: Authentication, Authorization, Accounting
MNO: Mobile Network Operator
BSS: Business support system
DCP: Device Connection Platform
PLMN: Public Land Mobile Network
MCC: Mobile Country Code
MNC: Mobile Network Code
SS7: Signaling System No. 7
EDCP: Ericsson Device Connection Platform
GPRS: General Packet Radio Service
SIM: Subscriber Identity Module
M2M: Machine-to-Machine
UICC: Universal Integrated Circuit Card
OEM: Original Equipment Manufacturer
MSISDN: Mobile Subscriber ISDN
ISDN: Integrated Services Digital Network
HLR: Home Location Register
PDP: Packet Data Protocol
APN: Access Point Name
GGSN: Gateway GPRS Support Node
SMSC: Short Message Service Center
MSC: Mobile Switching Center
VLR: Visitor Location Register

REFERENCES

The disclosures of each of the following references are hereby incorporated herein in their entireties by reference:
[1] GSMA Embedded SIM Remote Provisioning Architecture, Version 1.1, 17 Dec. 2013; and
[2] GSMA Remote Provisioning Architecture for Embedded UICC Technical Specification, Version 2.0, 13 Oct. 2014.

FURTHER DEFINITIONS

When an element is referred to as being "connected", "coupled", "responsive", or variants thereof to another element, it can be directly connected, coupled, or responsive to the other element or one or more intervening elements may be present. In contrast, when an element is referred to as being "directly connected", "directly coupled", "directly responsive", or variants thereof to another element, there are no intervening elements present. Like numbers refer to like nodes/elements throughout. Furthermore, "coupled", "connected", "responsive", or variants thereof as used herein may include wirelessly coupled, connected, or responsive. As used herein, the singular forms "a", "an" and "the" are intended to include the plural forms as well, unless the context clearly indicates otherwise. Well-known functions or constructions may not be described in detail for brevity and/or clarity. The term "and/or", abbreviated "/", includes any and all combinations of one or more of the associated listed items.

As used herein, the terms "comprise", "comprising", "comprises", "include", "including", "includes", "have", "has", "having", or variants thereof are open-ended, and include one or more stated features, integers, nodes, steps, components or functions but do not preclude the presence or addition of one or more other features, integers, nodes, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

It will be understood that although the terms first, second, third, etc. may be used herein to describe various elements/operations, these elements/operations should not be limited by these terms. These terms are only used to distinguish one element/operation from another element/operation. Thus a first element/operation in some embodiments could be termed a second element/operation in other embodiments without departing from the teachings of present inventive concepts. Examples of embodiments of aspects of present inventive concepts explained and illustrated herein include their complimentary counterparts. The same reference numerals or the same reference designators denote the same or similar elements throughout the specification.

Example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. These computer program instructions may be provided to a processor circuit (also referred to as a processor) of a general purpose computer circuit, special purpose computer circuit, and/or other programmable data processing circuit to produce a machine, such that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s).

These computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

A tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/BlueRay).

The computer program instructions may also be loaded onto a computer and/or other programmable data processing apparatus to cause a series of operational steps to be performed on the computer and/or other programmable apparatus to produce a computer-implemented process such that the instructions which execute on the computer or other programmable apparatus provide steps for implementing the functions/acts specified in the block diagrams and/or flowchart block or blocks. Accordingly, embodiments of present inventive concepts may be embodied in hardware and/or in software (including firmware, resident software, microcode, etc.) that runs on a processor such as a digital signal processor, which may collectively be referred to as "circuitry," "a module" or variants thereof.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many different embodiments have been disclosed herein, in connection with the above description and the drawings. It will be understood that it would be unduly repetitious and obfuscating to literally describe and illustrate every combination and subcombination of these embodiments. Accordingly, the present specification, including the drawings, shall be construed to constitute a complete written description of various example combinations and subcombinations of embodiments and of the manner and process of making and using them, and shall support claims to any such combination or subcombination.

Other network elements, communication devices and/or methods according to embodiments of inventive concepts will be or become apparent to one with skill in the art upon review of the present drawings and description. It is intended that all such additional network elements, devices, and/or methods be included within this description, be within the scope of the present inventive concepts. Moreover, it is intended that all embodiments disclosed herein can be implemented separately or combined in any way and/or combination. Accordingly, the above disclosed subject matter is to be considered illustrative, and not restrictive, and the appended claims are intended to cover all such modifications, enhancements, and other embodiments, which fall within the spirit and scope of present inventive concepts. Thus, to the maximum extent allowed by law, the scope of the present invention is to be determined by the broadest permissible interpretation of the following claims, and shall not be restricted or limited by the foregoing detailed description.

That which is claimed is:

1. A method of operating a wireless device wherein the wireless device includes memory with dummy subscription information stored therein, the method comprising:
   transmitting an attach request message over a radio interface to a mobile communication network, wherein the attach request message includes the dummy subscription information, wherein the dummy subscription information includes a dummy International Mobile Subscriber Identity (IMSI) for the wireless device;
   receiving an attach accept message from the mobile communication network over the radio interface, wherein the attach accept message is responsive to the attach request message;
   after receiving the attach accept message, establishing a Packet Data Protocol (PDP) connection using the dummy subscription information including the dummy IMSI;
   after transmitting the attach request message and after receiving the attach accept message, receiving active subscription information for the mobile communication network over the radio interface, wherein the active subscription information is different than the dummy subscription information, wherein the active subscription information includes an active IMSI for the wireless device, and wherein the dummy IMSI and the active IMSI are different, wherein receiving the active subscription information comprises receiving the active subscription information including the active IMSI over the radio interface using the PDP connection; and
   storing the active subscription information for the mobile communication network including the active IMSI in memory of the wireless device.

2. The method of claim 1 further comprising:
   after receiving the active subscription information, attaching to the mobile communication network over the radio interface using the active subscription information including the active IMSI.

3. The method of claim 2 wherein attaching to the mobile communication network using the active subscription information comprises enabling the active subscription information including the active IMSI for the mobile communication network and disabling the dummy subscription information including the dummy IMSI while maintaining the dummy subscription information in memory.

4. The method of claim 1 wherein receiving the active subscription information including the active IMSI comprises receiving the active subscription information including the active IMSI over the radio interface using a circuit switched connection.

5. The method of claim 1 wherein receiving the active subscription information including the active IMSI comprises receiving the active subscription information including the active IMSI over the radio interface using SS7 and/or SMS signaling.

6. The method of claim 1 wherein receiving the active subscription information including the active IMSI comprises receiving the active subscription information including the active IMSI over the radio interface using a packet switched connection.

7. The method of claim 1 wherein the dummy subscription information further includes a dummy access point name (APN) and/or dummy network credentials.

8. A method of operating a mobile communication network, the method comprising:
  receiving an attach request message from a wireless device, wherein the attach request message includes dummy subscription information including a dummy International Mobile Subscriber Identity (IMSI) for the wireless device, and wherein the dummy subscription information includes a dummy Access Point Name (APN);
  transmitting an attach accept message to the wireless device, wherein the attach accept message is responsive to the attach request message;
  establishing a Packet Data Protocol (PDP) connection between the wireless device and an initial registration node (IRN) based on the dummy IMSI;
  routing a location update message to an initial registration node (IRN) wherein the location update message includes the dummy subscription information including the dummy IMSI for the wireless device;
  after routing the location update message to the initial registration node, receiving active subscription information including an active IMSI from the initial registration node (IRN) over the PDP connection, wherein the dummy IMSI and the active IMSI are different; and
  transmitting the active subscription information including the active IMSI over the PDP connection to the wireless device.

9. The method of claim 8 further comprising:
  after transmitting the active subscription information including the active IMSI, accepting attachment of the wireless device using the active subscription information including the active IMSI.

10. The method of claim 9, wherein the dummy subscription information includes the dummy International Mobile Subscriber Identity (IMSI) and a dummy Access Point Name (APN), wherein establishing the PDP connection comprises establishing the PDP connection based on the dummy IMSI and the dummy APN.

11. The method of claim 8 wherein, receiving the active subscription information comprises receiving the active subscription information including the active IMSI over a packet switched connection, and wherein transmitting the active subscription information comprises transmitting the active subscription information including the active IMSI over the packet switched connection.

12. The method of claim 8 wherein routing the location update message to the initial registration node comprises routing the location update message responsive to determining that the dummy identification is a dummy identification number in a set of defined dummy identification numbers.

13. A method of operating an initial registration node (IRN), the method comprising:
  receiving a location update message for a wireless device from a mobile communication network, wherein the location update message includes dummy subscription information including a dummy International Mobile Subscriber Identity (IMSI) for the wireless device;
  responsive to receiving the location update message and responsive to determining that there is a need to download a new active subscription to the wireless device, generating a request for provisioning information for the wireless device;
  responsive to receiving the location update message that includes the dummy subscription information including the dummy IMSI, obtaining active subscription information for the wireless device, wherein the active subscription information includes an active IMSI, and wherein the dummy IMSI and the active IMSI are different, wherein obtaining the active subscription information comprises receiving the active subscription information including the active IMSI for the wireless device after generating the request for provisioning information for the wireless device; and
  transmitting the active subscription information including the active IMSI through the mobile communication network to the wireless device.

14. The method of claim 13, wherein the dummy subscription information includes the dummy International Mobile Subscriber Identity (IMSI) and a dummy Access Point Name (APN), wherein transmitting the active subscription information includes establishing a Packet Data Protocol (PDP) connection through the mobile communication network between the wireless device and the initial registration node (IRN) based on the dummy IMSI and the dummy APN, and transmitting the active subscription information including the active IMSI over the PDP connection.

15. The method of claim 13 wherein transmitting the active subscription information comprises transmitting the active subscription information including the active IMSI through the mobile communication network to the wireless device over a packet switched connection.

16. The method of claim 13 further comprising:
  before transmitting the active subscription information including the active IMSI, establishing a circuit switched (CS) connection through the mobile communication network between the wireless device and the initial registration node (IRN),
  wherein transmitting the active subscription information comprises transmitting the active subscription information including the active IMSI over the circuit switched connection through the mobile communication network to the wireless device.

17. The method of claim 16 wherein transmitting the active subscription information comprises transmitting the active subscription information including the active IMSI through the mobile communication network to the wireless device using SS7 and/or SMS signaling.

\* \* \* \* \*